United States Patent [19]
Erdle et al.

[11] Patent Number: 5,684,273
[45] Date of Patent: Nov. 4, 1997

[54] BUS BAR AND NOVEL TORQUE CLIP THEREFOR

[75] Inventors: Harvey B. Erdle; Craig C. Bader; Kevin J. Madigan, all of Rochester, N.Y.

[73] Assignee: Eldre Corporation, Rochester, N.Y.

[21] Appl. No.: 705,403

[22] Filed: Jul. 29, 1996

[51] Int. Cl.$^6$ ..................... H01B 7/00
[52] U.S. Cl. ............ 174/72 B; 174/71 B; 174/88 B
[58] Field of Search ............ 174/68.2, 70 B, 174/71 B, 72 B, 88 B, 177 F, 117 FF; 439/801, 809, 114, 212, 213, 214; 403/22; 411/132, 970

[56] References Cited

U.S. PATENT DOCUMENTS

| | | | |
|---|---|---|---|
| 873,872 | 12/1907 | Krantz | 439/809 |
| 1,194,231 | 8/1916 | Randall | 439/801 |
| 3,264,430 | 8/1966 | Kotos | 335/51 |
| 3,476,871 | 11/1969 | Erdle | 174/88 B |
| 3,966,296 | 6/1976 | Ericson | 439/801 |
| 5,055,059 | 10/1991 | Logstrup | 439/214 |
| 5,364,203 | 11/1994 | Ishikawa | 174/71 B X |

*Primary Examiner*—Hyung S. Sough
*Attorney, Agent, or Firm*—Shlesinger, Fitzsimmons & Shlesinger

[57] ABSTRACT

A laminated bus bar is supported on an elongate, rigid substrate, and has at least one, thin, metal terminal projecting laterally therefrom beyond one of the side edges of the substrate. A generally rigid torque clip, which may be made from a plastic material, is mounted on the substrate, and has thereon an integral lug portion, which also projects laterally beyond the same side edge of the substrate, and in registry with the terminal. The terminal has secured thereon a PEM nut or the like, which is positioned in an opening or a recess in the lug portion to retain the terminal in a predetermined position during use. If desired the terminal may be folded around the nut, or may be provided with a tab which is secured in an opening in the lug portion of the terminal.

20 Claims, 3 Drawing Sheets

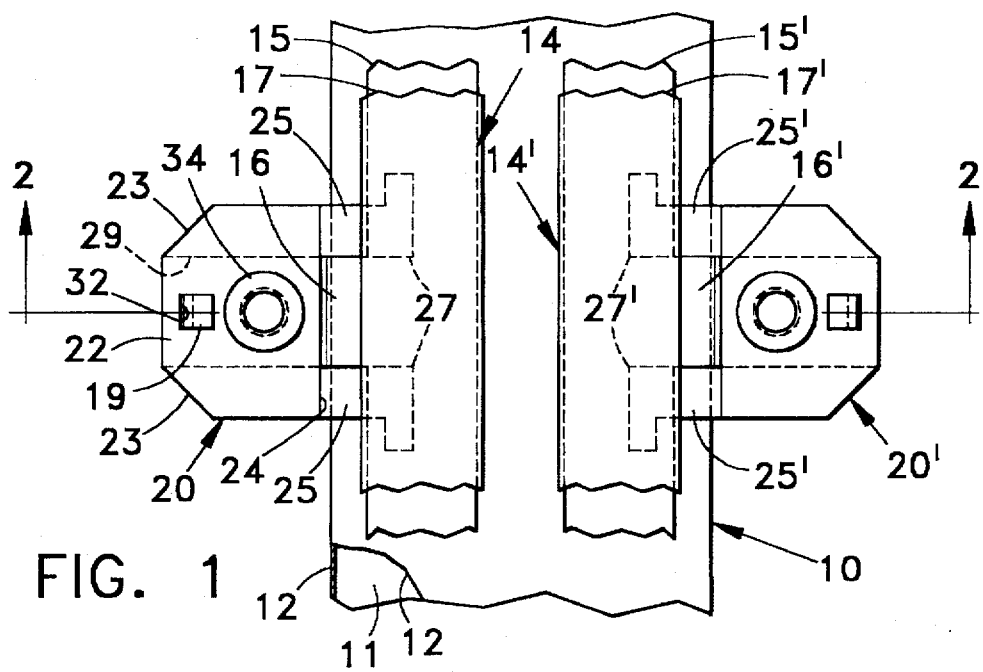
FIG. 1
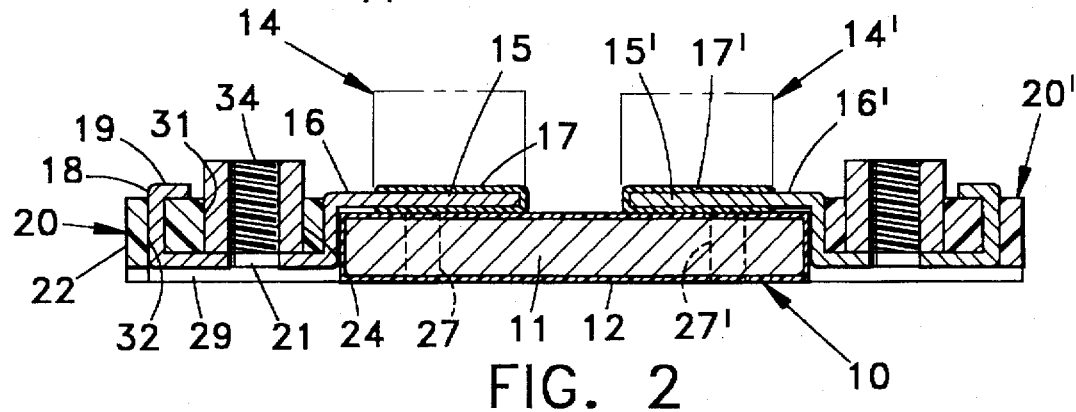
FIG. 2
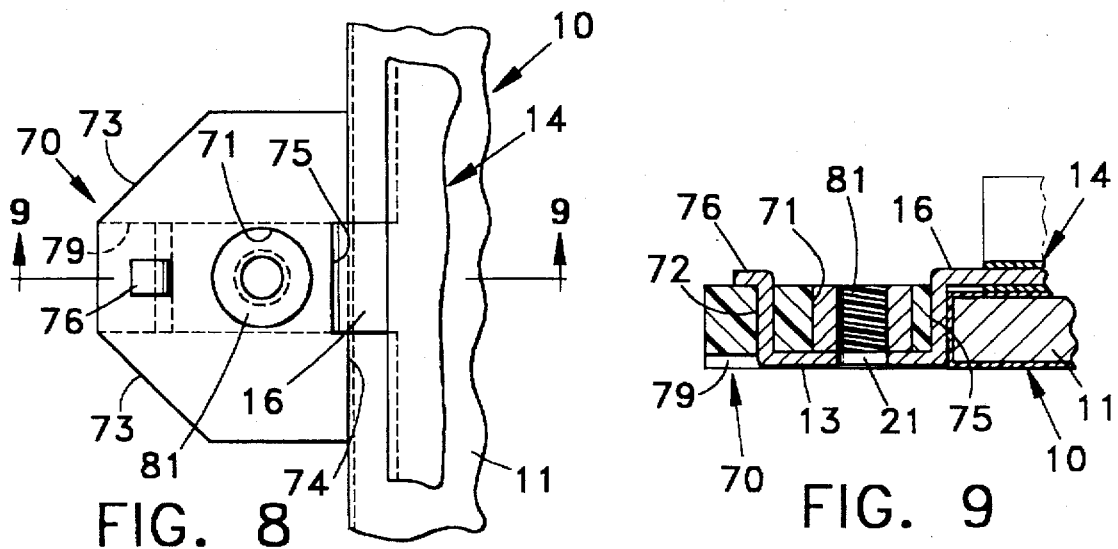
FIG. 8
FIG. 9

5,684,273

BUS BAR AND NOVEL TORQUE CLIP THEREFOR

BACKGROUND OF THE INVENTION

This invention relates to laminated bus bars, and more particularly to relatively thin gauge bus bars having improved, torque resistant terminals or tabs projecting from the longitudinal sides. Even more particularly, this invention relates to novel torque resisting clips, which are attached to the tabs of a bus bar assembly of the type described in order to prevent twisting of the tabs during installation or electrical cabling of a bus bar into associated equipment.

Typically bus bars of the type described comprise a plurality of elongate, thin copper strips or conductors that are laminated between layers of insulation. Each copper strip has a plurality of integral, longitudinally-spaced tabs or lugs which project from one or both of the longitudinal side edges of the strip, and outwardly beyond the longitudinal side edge or edges of the laminated insulation, so that the tabs or lugs can be connected in an electrical circuit. Bus bars with tabs of the type described are shown, for example, in U.S. Pat. Nos. 3,264,430 and 3,476,871.

In practice, certain of the terminal tabs or lugs of the type described have formed therethrough circular openings for accommodating the shank of a pin or screw which is used for securing the terminal lug to a wire lead or some other component in an electrical circuit. However, because of the relatively thin gauge of the associated bar and its integral terminal tabs, the tabs are very often subjected to undesirable twisting or distortion during assembly into associated electrical equipment. This undesirable twisting of a bus bar tab often results in undesirable failure of the tab itself, and the circuit associated therewith.

In addition, there are instances in which it is desirable to connect a copper conductor strip itself, rather than one of its tabs, via a screw or pin to an associated electrical device. However, because the strip is of such a fine gauge, it tends to fail in use, even when secured to an associated circuit or device by a screw.

One object of this invention, therefore, is to provide improved means for connecting the copper conductor strips of laminated bus bars and the like to an associated circuit or electrical device.

It is object also of this invention to provide an improved laminated bus bar having the longitudinally-spaced terminal tabs or lugs of which have improved resistance to undesirable twisting or distortion resulting from manipulation of the bar during installation in associated electrical equipment.

A more specific object of this invention is to provide for bus bars of the type described a novel torque clip, which is adapted to be secured to a respective terminal tab of the bar to support the tab against undesirable distortion or bending during use.

Other objects of the invention will be apparent hereinafter from the specification and from the recital of the appended claims, particularly when read in conjunction with the accompaning drawings.

SUMMARY OF THE INVENTION

The spaced circuit-connecting tabs, which project from the side of a laminated bus bar, are secured against undesirable twisting or bending during use by mounting the bars on an elongate, rigid substrate, for example a ground bus, and then securing to the substrate adjacent each bus bar tab a rigid, plastic torque clip which projects from one side of the substrate to register with a respective tab. The clip has therein an opening into which the associated conductor tab is inserted and then folded or bent into engagement with a metal insert, such as a nut or metal sleeve, which is secured in an opening in the torque clip. Since the torque clip is secured to the substrate, and the associated conductor tab is secured to the torque clip, the clip supports the tab against any twisting or bending during use. The clips may be produced and attached to the substrate individually, as an integral pair or as one of many such clips that are integral with and spaced along an elongate strip.

THE DRAWINGS

FIG. 1 is a fragmentary plan view of a pair of laminated bus bars mounted on a ground bus, and with one laterally projecting terminal tab or lug of a conductor in each bus bar being secured to and supported by a novel torque clip made according to one embodiment of this invention;

FIG. 2 is a slightly enlarged cross-sectional view taken generally along the line 2—2 in FIG. 1 looking in the direction of the arrows, and with each bus bar being shown fragmentarily;

FIG. 8 is a fragmentary plan view of part of a laminated bus bar and associated ground bus of the type shown in FIG. 1, and illustrating still, another embodiment of this torque clip; and FIG. 9 is a fragmentary sectional view taken generally along the line 9—9 in FIG. 8 looking in the direction of the arrows.

DETAILED DESCRIPTION OF THE PREFERRED EMBODIMENTS

Figure 3:
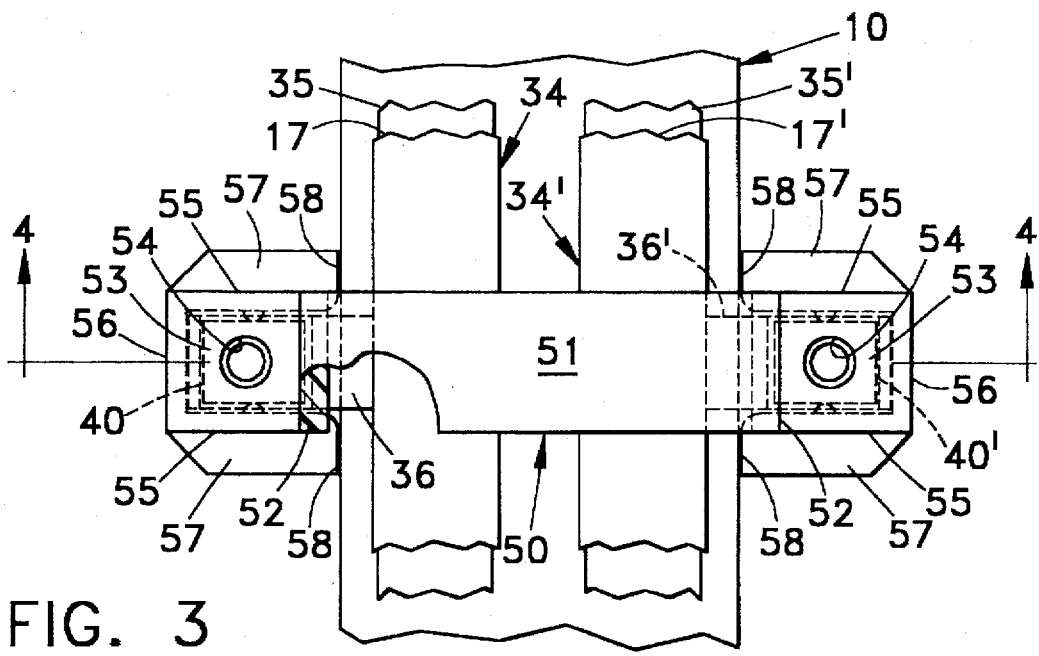
FIG. 3 is a fragmentary plan view generally similar to that shown in FIG. 1, but showing a modified torque clip made according to a second embodiment of this invention, the clip being cut away in part and being shown connected to and supporting one terminal or lug of each of the two bus bars.

Referring now to the drawings by numerals of reference, and first to FIGS. 1 and 2, 10 denotes generally an elongate, generally rigid substrate, which in the embodiment illustrated is designed to function as a ground bus, and therefore comprises an elongate copper bar or strap 11 that for the most part is enclosed in layers 12 of insulation. Mounted on the upper surface of substrate 10, and extending longitudinally thereof in spaced, parallel relation to each other are two laminated bus bars which are denoted generally by the numerals 14 and 14'. The bars 14 and 14' are generally similar in configuration and comprise pluralities of thin, elongate copper strips 15 and 15', respectively, stacked one above the other and laminated in a conventional manner between thin layers 17 and 17' of plastic, dielectric insulating material. For purposes of disclosing this embodiment of the invention only the lowermost conductor strips 15 and 15' of the bus bars have been shown in detail in FIGS. 1 and 2.

As is true of conventional laminated bus bars, each of the elongate conductor strips 15, 15' has projecting from at least one longitudinal side edge thereof a plurality of laterally extending tabs 16, 16', respectively, which form terminals for connecting the associated conductor strips into an electrical circuit. In FIGS. 1 and 2 one such tab 16 of the illustrated conductor strip 15 is shown projecting beyond the left hand edge of the insulation 17 that encloses that strip 15, while 16' denotes a terminal tab that projects laterally beyond the right hand edge of the insulation 17' enclosing the strip 15' of the bus bar 14'. To prevent undesirable twisting or distortion of the tabs 16 and 16' during installation and use of their associated bus bars, the tabs are connected to novel torque clips, which are denoted generally by the numerals 20 and 20', respectively. Since the clips 20 and 20' are similar in construction and function, as are the respective tabs 16 and 16', only one such clip and tab (clip 20 and tab 16) will be described in further detail herein.

Clip 20, which is made from a generally rigid, plastic, heat resistant material, has a generally rectangularly shaped central, insert supporting section 22 having an outer edge the corners of which are beveled as at 23. Section 22 has an inner edge 24 which is disposed in spaced, parallel, confronting relation to the adjacent longitudinal side edge of the substrate 10. Integral with and projecting at right angles from the edge 24 of section 22 in spaced, parallel relation to each other are two clip supporting legs 25, which are generally L-shaped in configuration, and which are slidably seated in a pair of correspondingly shaped grooves or slots 27 formed in the confronting edge of the substrate 10. When the clip 20 is supported by its legs 25 on the substrate 10, the clip is secured against any twisting or lateral movement relative to the substrate 10.

In the underside thereof the insert supporting section 22 of clip 20 has formed therein a shallow, rectangular groove 29, which registers at its inner end with the space between the mounting legs 25 of the clip. Section 22 of clip 20 has therethrough, approximately centrally thereof, a circular opening 31 which opens at its lower end on groove 29. Between the opening 31 and the outer edge of clip 20, section 22 has therethrough a rather small, rectangular opening 32, which extends parallel to opening 31. Secured, for example ultrasonically, adjacent its lower end in the opening 31 of clip 20 is an internally threaded, stainless steel sleeve or insert 34, the bore of which opens on groove 29.

The legs 25 of clip 20, which support the inner edge 24 of central section 22 in slightly spaced, confronting relation to the BO adjacent side edge of the substrate 10, are spaced from each other a distance only slightly greater than the overall width of the elongate, rectangular tab 16 of the conductor 15. Moreover, tab 16, which has several right angle bends formed therein intermediate its ends, has projecting centrally from its outer edge remote from the conductor 15 an integral, narrow tab 18, which is designed to be inserted into the opening 32 in clip 20 as noted hereinafter. This construction enables the tab 16 to perform the dual function of securing the clip 20 to the substrate 10, and also electrically to connect its associated conductor 15 to the metal insert 34 in clip 20.

For example, a first portion of tab 16 adjacent its inner end is bent at right angles to extend downwardly into the space between the inner edge 24 of the clip 20 and the adjacent edge of substrate 10; a second portion is bent at right angles to pass horizontally into groove 29 along the bottom of clip 20; the tang 18 on the outer end of the tab is bent again at right angles to pass upwardly through the opening 32 in the clip 20; and the upper, terminal end of tang 18 is bent at right angles over the upper surface of clip 20 as at 19, thereby to secure the clip to the substrate 10, and also to insure that the lower end of the metal insert 34 will be in contact with the tab 16. At this stage an opening 21 in tab 16 is disposed in coaxial registry with the bore in the metal insert 34, so that an externally threaded fitting of conventional design can be employed for securing fitting 34 and tab 16 in an electrical circuit. Once this has been done the clip 20, now firmly attached to the substrate 10, prevents any undesirable twisting or bending of the associated tab 16 in any direction during installation and use of the associated bus bar 14.

While this first embodiment has been illustrated and described in detail in connection only with the clip 20, it will be appreciated that clip 20' is installed and functions in the same manner in connection with the tab 16' of conductor 15'. Also, it will be apparent that similar clips 20 and 20' can be employed for supporting others of the longitudinally spaced terminal tabs that project from others of the conductor strips in the laminated bus bars 14 and 14'. Moreover, while this embodiment of the invention has been described in connection with the mounting of the tips 20 on a copper ground bus, it will be apparent that the substrate 10 can comprise any elongate, rigid substrate which can be provided with the necessary slots 27 for accommodating the legs 25 of clips 20. Also, simply by way of example, the plastic clips 20 may be made from a plastic material of the type comprising 50% long fiber glass filled polyphenylene sulphite, or similar such material which will provide maximum strength and heat resistance for the associated clips.

Referring now to the embodiment shown in FIGS. 3 to 5, 10 denotes generally an elongate substrate similar to that shown in the first embodiment. Mounted as in the first embodiment on the upper surface of substrate 10 are two elongate, spaced, parallel laminated bus bars 34 and 34', which are generally similar to the bus bars disclosed in the first embodiment, except that their O respective conductor strips 35 and 35' have laterally projecting terminal tabs 36 and 36', respectively, which are slightly different in configuration then the tabs 16 and 16' shown in the first embodiment. Also, merely for purposes of illustration, the second embodiment has been described in detail in connection with the uppermost conductor strip 35 and 35' of a respective bus bar, rather than the lowermost such strip as shown in the first embodiment.

For example, each tab 36 projecting from the conductor 35 is elongate, rectangular in configuration, and is bent intermediate its ends to extend at right angles downwardly as at 37 over the outside, longitudinally extending edge of the bus bar 34 to a point or line adjacent the lower surface of the substrate 10, and then is bent at right angles horizontally outwardly as at 38 away from the adjacent side edge of the substrate 10, and thereafter is bent again at right angles, vertically upwardly as at 39 for a distance substantially equal to the height of a nut 40, which is seated on the horizontal section 38 of the tab. The remaining terminal end portion 41 is bent again at ninety degrees to extend horizontally inwardly toward section 37 and over the top of the nut 40. In this manner the internally threaded nut 40 is mounted snugly between the vertically spaced, horizontal extending sections 38 and 41 of tab 36, and in such manner that the internally threaded bore in the nut 40 registers with a circular opening 42 formed in the terminal end portion 41 of the tab.

Numeral 50 denotes an inverted, generally U-shaped clip, which functions to stabilize both the opposed conductor tabs 36 and 36', which have housed therein the nuts 40 and 40', respectively. Clip 50 comprises an elongate, generally strap shaped central section 51 which is rectangular in cross section, and which extends transversely across, and is seated upon, the upper surfaces of the two laminated bus bars 34 and 34'. Section 51 has spaced, parallel side edges, and is slightly wider than the tabs 36 and 36' and slightly longer than the space between sections 37 and 37' of the tabs 36 and 36'. At opposite ends thereof section 51 has integral, downwardly depending end walls 52, which extend part way down over the outer surfaces of the tab sections 37 and 37', and which have at their lower ends lateral flange sections 53, which extend horizontally outwardly from the walls 52 and over the terminal ends 41 and 41' of the tabs 36 and 36', respectively. The flange sections 53 have therethrough circular openings 54 which register through the openings 41 and 41' with the bores in the nuts 40 and 40', respectively.

Each flange section 53 also has a pair of spaced, parallel, downwardly depending side walls 55 one pair of which flanks and encloses opposite sides of nut 40 and the portions of tab 36 bent thereabout, and the other pair of which flank and enclose opposite sides of nut 40', and the portions of tab 36' bent thereabout. Each flange 53 also has projecting downwardly from its outer edge and transversely between its side walls 55 an end wall 56, one of which overlies section 39 of tab 36, and the other of which overlies section 39' of tab 36'. Integral with and projecting laterally outwardly from the outer surfaces from each of the flange sidewalls 55 is a clip supporting tab or lug 57 having a plane inner edge 58, which is disposed to be positioned in closely spaced, confronting, parallel relation to one of the longitudinal side edges of the substrate 10, when the clip 51 is mounted as shown in the drawings.

Figure 4:
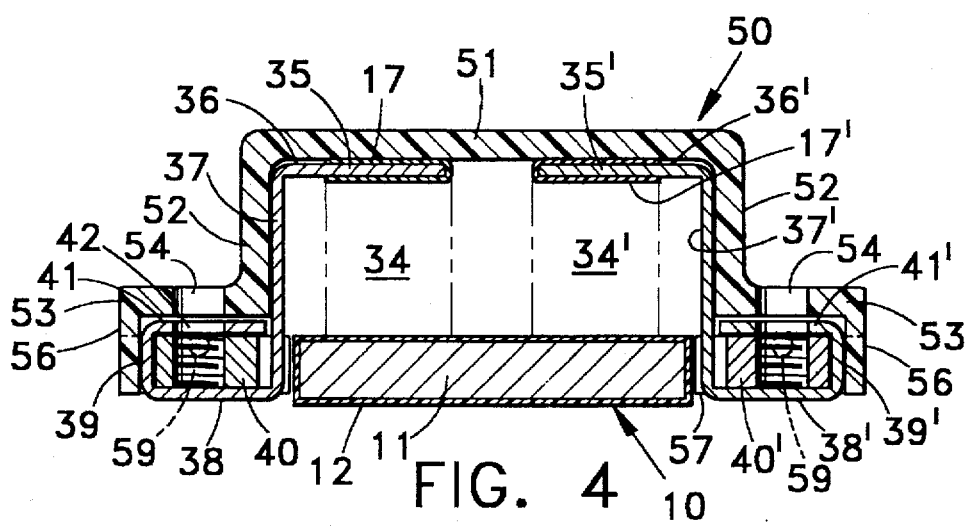
FIG. 4 is a sectional view taken generally along line 4—4 in FIG. 3 looking in the direction of the arrows, portions of the two bus bars again being shown fragmentarily.
Figure 5:
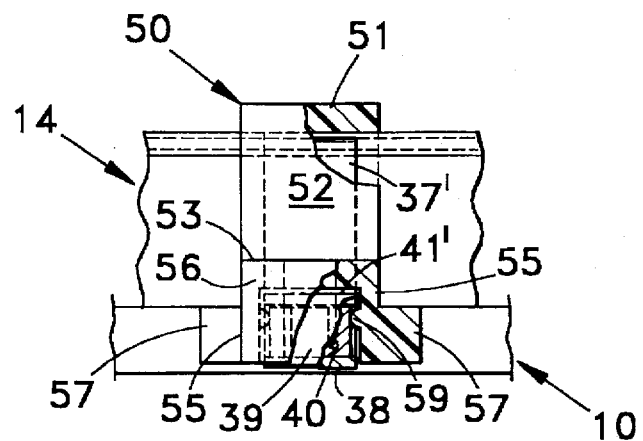
FIG. 5 is a fragmentary side elevation view as seen when looking at the left side of the assembly as shown in FIG. 4, and with portions thereof cut away.

After the nuts 40 and 40' have been enclosed within the bent sections of the respective conductor tabs 36 and 36', they are attached to the supporting clip 51 simply by inserting the clip 51 downwardly into its operative position as shown in FIGS. 3 to 5, so that the underside of the central section 51 is seated on the upper surfaces of the bus bars 34 and 34'. At this time the flange sections 53 at opposite ends of the center section 51 of the clip will be positioned to have their openings 54 registering with the bores in the nuts 40 and 40', and with the walls 55 and 56 of a respective flange section 53 enclosing and supporting opposite sides and the outer end of a respective bent section of a tab 36 or 36', and the nut 40 or 40' enclosed therein. At each end of the clip each of the two sidewalls 55, which project downwardly from the associated flange section 53, has projecting substantially centrally from the inside surface thereof an integral, segmental spherical detent 59, which registers coaxially with a like detent 59 that projects from the inside surface of the opposed side wall 55. Thus, each of the nuts 40 and 40' is frictionally engaged at opposite sides thereof by the inner ends of a registering pair of the detents 59, which thus function releasably to secure the clip 51 in an operative position over the bus bars 34 and 34'. Thereafter, when the bus bars 34 and 34' are connected in a circuit, the clip 51 will be permanently fixed or secured to the associated bus bars by threaded connecting screws or bolts (not illustrated) which will be inserted through the openings 54 in section 53, and threaded into the nuts 40 and 40'.

Figure 6:
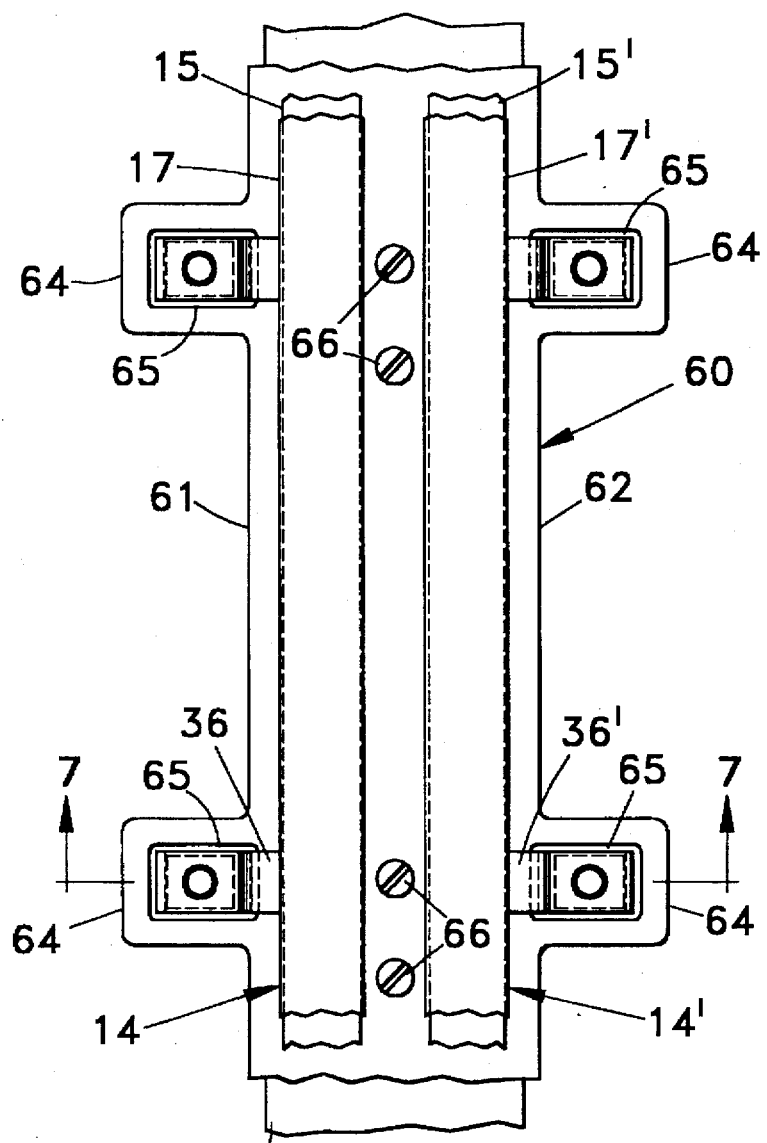
FIG. 6 is a fragmentary plan view of still another form of a torque clip made according to another embodiment of this invention.
Figure 7:
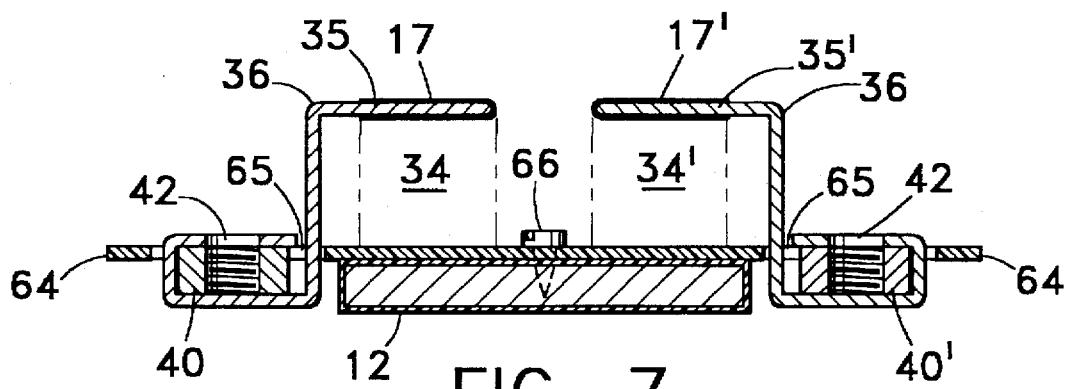
FIG. 7 is a slightly enlarged cross-sectional view taken generally along line 7—7 in FIG. 6 looking in the direction of the arrows.

Instead of using a separate torque clip for each conductor tab 16, as in the embodiment of FIGS. 1 and 2, or for each pair of opposed tabs 36,36', as shown in FIGS. 3 to 5, it is possible to employ one elongate torque clip device for reinforcing each of a plurality of such tabs longitudinally of a bus bar or pair thereof. For example, as shown in FIGS. 6 and 7, wherein like numerals are employed to denote elements similar to those employed in the embodiment shown in FIGS. 3 to 5, 60 denotes generally an elongate, multi-torque clip panel or strip having spaced, parallel, longitudinally extending side edges 61 and 62, and a plurality of integral, longitudinally spaced tabs or lugs 64 projecting equidistantly from each edge 61 and 62 thereof. In the embodiment illustrated, the lugs 64 are alike and are arranged in pairs spaced longitudinally of the strip 60, and with the two lugs of each pair projecting from the opposed side edges 61 and 62, respectively, and registering with each other longitudinaly to the strip. Moreover, the lugs 64 are generally rectangular in configuration, and each has therethrough a central opening 65 which likewise is rectangular in configuaration.

In use, strip 60, which is made from a generally rigid plastic material, is secured by screws 66 onto the upper surface of substrate 12 medially of its edges, and has a pair of laminated bus bars 14 and 14' secured on the upper surface thereof. In a manner similar to that disclosed in the preceding embodiment the tabs 36,36' of conductors 35,35' extend downwardly through the openings 65 in the registering lugs 64, and then are folded about nuts 40 and 40' to retain the latter in the openings 65 in the respective lugs 64. Nuts 40,40' and the surrounding tabs 36,36' are thus secured against movement relative to the bus bars 14,14' by their respective lugs 64.

FIGS. 8 and 9 illustrate a modified form of the clip shown in FIGS. 1 and 2. In this embodiment, wherein like numerals are employed to denote elements similar to those shown in the first embodiment, 70 denotes generally a modified torque clip suitable for use in combination with a bus bar 14 supported on a rigid substrate 11. Clip 70 is generally rectangular in configuration, and has plane, parallel upper and lower surfaces similar to those of clip 20. Also like clip 20, chip 70 has an outer edge the corners of which are beveled as at 73. However, the inner edge 74 of clip 70 differs from that of clip 20 in that it does not have projecting therefrom integral legs of the type denoted at 25 in FIGS. 1 and 2. Instead, edge 74 presents a plane, flat surface having therein medially of its ends a shallow, vertically extending notch or slot 75 which is slightly wider than the tab or terminal 16 projecting from the bus bar 14. Notch 75 registers at its lower end with one end of a shallow, rectangularly-shaped groove 79 formed in the bottom of clip 70 to extend at right angles to notch 75, and having a width similar to that of notch 75.

In use, each of a plurality of spaced terminals 16, only one of which is shown in FIGS. 8 and 9, is bent adjacent one end thereof downwardly over the adjacent side of the substrate 10, and then horizontally outwardly as at 13. Secured at its lower end to register coaxially with an opening 21 formed in the horizontal section 13 of each terminal 16 is a PEM nut 81, or the like. Each clip 70 has therethrough a central, circular opening 71, which has a diameter only slightly greater than the outside diameter of the nut 81, and adjacent its outer edge a small rectangular opening 72, which is similar to opening 32 in clip 20. To secure a clip 70 to a terminal 16, a narrow, rectangular tab 76, which projects centrally from the outer end of each terminal 16, is bent vertically upwardly in spaced parallel relation to the adjacent nut 81, and in such manner that the openings 71 and 72 in the clip 70 register with nut 81 and the upwardly projecting tab 76, respectively. The clip 70 is then inserted downwardly over the horizontally projecting section 13 of the terminal with the nut 81 and tab 76 extending into openings 71 and 72, respectively, and with part of the terminal seated in notch 75. Thereafter the terminal end of tab 76 is bent over the upper surface of clip 70 as shown in FIGS. 8 and 9. This places the inner edge 74 of the clip in confronting engagement with the side of substrate 10, thus preventing any undesirable bending of the associated terminal 16.

While in many cases it is preferred to make the torque clips from electrically nonconductive material, such as plastic, it is possible alternatively to produce them from a metallic material, if desired. Also, it will be apparent that the novel clips disclosed herein may be employed with a single, conventional bus bar having spaced terminals projecting from the opposed edges thereof, and particularly in the case of the clips disclosed in FIGS. 3 to 7 may be employed without using the substrate 10. Moreover, although this invention has been illustrated and described in detail in connection with only certain embodiments thereof, it will be apparent that it is capable of even further modification, and that this application is intended to cover any such modifications which may fall within the scope of one skilled in the art and the appended claims.

We claim:

1. A bus bar structure, comprising a rigid substrate having at least two opposed edges, at least one laminated bus bar assembly supported on said substrate and having at least one, thin, metal terminal projecting laterally therefrom beyond one of said two opposed edges of said substrate, a generally rigid torque chip mounted on said substrate and having thereon at least one integral lug portion which projects laterally beyond said one of said two edges of said substrate, and into engagement with said one terminal, and means securing said one terminal to said lug portion of said clip to be supported thereby in a predetermined position.

2. A bus bar structure as defined in claim 1, wherein said clip has a further portion thereof secured to a registering portion of said substrate and operative to secure said clip against movement relative to said substrate.

3. A bus bar structure as defined in claim 1, wherein said means securing said one terminal to said lug portion of said clip comprises a portion of said terminal that is operatively folded snugly about a registering portion of said lug portion of the clip.

4. A bus bar structure as defined in claim 3, including a metal sleeve secured in an opening in said lug portion of said clip and having one end thereof engaged with said folded portion of said terminal.

5. A bus bar structure as defined in claim 1, wherein said means securing said one terminal to said lug portion of said clip comprises, a nut secured against rotation in an opening in said lug portion of said clip, and a portion of said terminal being operatively folded snugly about said nut.

6. A bus bar structure as defined in claim 5, wherein said folded portion of said terminal has an opening therein registering with an opening in said nut.

7. A bus bar structure as defined in claim 1, wherein said bus bar assembly has at least one, further, thin, metal terminal projecting laterally therefrom beyond the opposite of said two opposed edges of said substrate, said torque clip having thereon another, integral lug portion projecting laterally therefrom beyond said opposite edge of said substrate and into engagement with said one further terminal on said bus bar assembly.

8. A bus bar structure as defined in claim 7, wherein said torque clip has a central portion thereof overlying said bus bar assembly transversely thereof, and has spaced sidewall portions extending downwardly adjacent said two opposed edges of said substrate, said lug portions being integral with and projecting laterally from said sidewall portions of said clip.

9. A bus bar structure as defined in claim 8, wherein a nut is secured in a recess in each of said lug portions of said clip, and each of said terminals is folded snugly about the nut secured in the lug portion of the clip with which the respective terminal is engaged.

10. A bus bar structure as defined in claim 1, wherein said rigid substrate comprises a metal ground bus conductor for said assembly.

11. A bus bar structure as defined in claim 7, wherein said torque clip has a plane central portion seated on the surface of said substrate beneath said bus bar assembly, and said lug portions are integral with and project laterally from said central portion of said clip.

12. A bus bar structure as defined in claim 11, wherein said lug portions are coplanar with said central portion of said clip.

13. A bus bar structure as defined in claim 11, wherein said central portion of said torque clip has opposed side edges thereof extending longitudinally of said substrate, and a plurality of said lug portions project laterally from each of said side edges of said central portion at longitudinally-spaced points therealong.

14. A bus bar structure as defined in claim 11, wherein a nut is positioned in an opening in each of said lug portions, and each of said terminals is folded snugly about the nut positioned in its associated lug portion of said clip.

15. A bus bar structure comprising a laminated bus bar assembly having opposed edges, and having at least one, thin, metal terminal projecting from each of said edges, a generally rigid torque clip having a central portion thereof extending transversely of said bus bar assembly between said opposed edges thereof, said torque clip having formed on opposite ends of said central portion thereof integral lug portions projecting laterally beyond said opposed edges of said bus bar assembly, and into engagement with the terminals projecting from said assembly, and means securing each of said terminals to one of said lug portions of said torque clip.

16. A bus bar structure as defined in claim 15, wherein said central portion of said torque chip overlies said bus bar assembly and has spaced sidewall portions extending downwardly adjacent said opposed edges of said assembly, and said integral lug portions project laterally from said sidewall portions of said clip.

17. A bus bar structure as defined in claim 16, wherein a nut is seated in a recess in each of said lug portions of said clip, and each of said terminals is engaged intermediate its ends with one end of the nut seated in the lug portion of the clip with which the respective terminal is engaged.

18. A bus bar structure as defined in claim 16, wherein said torque clip is inverted U-shaped in configuration.

19. A bus bar structure as defined in claim 15, wherein said lug portions are coplanar with said central portion of said torque clip.

20. A bus bar structure as defined in claim 15, wherein said central portion of said torque clip has opposed side edges thereof extending longitudinally of said assembly, and a plurality of said lug portions project laterally from each of said side edges of said central portion of the clip at longitudinally-spaced points therealong.

* * * * *